(12) United States Patent
Shiu et al.

(10) Patent No.: US 8,492,993 B2
(45) Date of Patent: Jul. 23, 2013

(54) LED DRIVING CIRCUIT AND POWER CONVERTING CIRCUIT

(75) Inventors: Shian-Sung Shiu, Taipei County (TW); Chen-Hsung Wang, Taipei County (TW); Chung-Che Yu, Taipei County (TW)

(73) Assignees: Green Solution Technology Co., Ltd., New Taipei (TW); Niko Semiconductor Co., Ltd., New Taipei (TW)

( * ) Notice: Subject to any disclaimer, the term of this patent is extended or adjusted under 35 U.S.C. 154(b) by 306 days.

(21) Appl. No.: 12/906,145

(22) Filed: Oct. 18, 2010

(65) Prior Publication Data
US 2011/0210682 A1    Sep. 1, 2011

(30) Foreign Application Priority Data
Feb. 26, 2010   (TW) ............................. 99105557 A

(51) Int. Cl.
*G05F 1/00* (2006.01)
*H05B 37/02* (2006.01)

(52) U.S. Cl.
USPC ........................................ 315/291; 315/307

(58) Field of Classification Search
USPC ................ 315/291, 307, 308, 310, 312, 244, 315/246, 224, 209 R
See application file for complete search history.

(56) References Cited

U.S. PATENT DOCUMENTS

| | | | |
|---|---|---|---|
| 7,250,810 B1 * | 7/2007 | Tsen et al. ..................... | 327/536 |
| 7,271,642 B2 * | 9/2007 | Chen et al. ..................... | 327/514 |
| 7,843,148 B2 * | 11/2010 | Gater et al. ..................... | 315/291 |
| 8,035,311 B2 * | 10/2011 | Prexl et al. ..................... | 315/291 |

* cited by examiner

*Primary Examiner* — Minh D A
(74) *Attorney, Agent, or Firm* — Jianq Chyun IP Office

(57) ABSTRACT

A power converting circuit having the function of circuit detecting is provided. The power converting circuit has a transistor, a controller and a detecting circuit. The transistor receives an input voltage. The controller is coupled to a control end of the transistor to control the conducting state of the transistor so as to stabilize the output of the power converting circuit. The detecting circuit detects at least one of the control end and the low voltage end of the transistor, and generates a state signal when the detected voltage of any one of the control end and the low voltage end does not fall within a corresponding predetermined voltage range. The state signal is utilized for stopping a power circuit which provides the input voltage providing the input voltage. In addition, a light emitting diode driving circuit having the function of circuit detecting is also provided.

13 Claims, 6 Drawing Sheets

LED DRIVING CIRCUIT AND POWER CONVERTING CIRCUIT

CROSS-REFERENCE TO RELATED APPLICATION

This application claims the priority benefit of Taiwan application serial no. 99105557, filed on Feb. 26, 2010. The entirety of the above-mentioned patent application is hereby incorporated by reference herein and made a part of this specification.

BACKGROUND OF THE INVENTION

1. Field of the Invention

The invention relates to a light emitting diode (LED) driving circuit and a power converting circuit. More particularly, the invention relates to an LED driving circuit and a power converting circuit having the function of circuit detecting.

2. Description of Related Art

As the increase of luminescent efficiency of LEDs, LEDs are gradually used to replace conventional lighting apparatuses such as light bulbs or tubes. Basically, the brightness of LEDs is determined by the magnitude of the current flowing through LEDs. Accordingly, a suitable circuit design for LED driving circuits is necessary to effectively control the magnitude of the current flowing through LEDs.

FIG. 1 is a circuit diagram of a conventional LED driving circuit. As shown in FIG. 1, LEDs D1 to D2 are coupled in series to ensure the magnitude of the current i0 flowing through each of the LEDs D1 to D2 is substantially constant. There are a transistor T0 and a resistor R0 coupled between the LED D2 and the ground end G. Herein, the resistor R0 is used to generate the feedback signal VFB. The voltage of the feedback signal VFB is equal to the product of the current i0 flowing through the LEDs and the resistance of the resistor R0. The transistor T0 is used to control the magnitude of the current i0 flowing through each of the LEDs D1 to D2.

Furthermore, the LED driving circuit includes an operational amplifier EA0 of which the inverting input end receives the feedback signal VFB, the non-inverting input end receives a reference voltage signal VREF, and the output end is coupled to the gate of the transistor T0. The operational amplifier EA0 and the transistor T0 form a feedback circuit to stabilize the level of the feedback signal VFB, so as to make the level of the feedback signal VFB be equal to that of the reference voltage signal VREF. Namely, the feedback circuit can stabilize the current i0 flowing through the LEDs D to D2 to a predetermined current value.

Generally, LED driving circuits usually provide an open-circuit protection to deal with the condition of open-circuit due to LEDs. When the condition of open-circuit due to the LEDs D1 to D2 occurs, the current i0 flowing through the LEDs D1 to D2 is decreased to zero, such that the source voltage of the transistor T0 is also decreased to zero. At this time, the open-circuit protection is activated to stop the LED driving circuit. Besides, when the condition of short-circuit occurs in some of the LEDs, the current i0 flowing through the LEDs D1 to D2 is increased because the voltage difference of the LEDs D1 to D2 is lowered. At this time, the feedback circuit formed by the operational amplifier EA0 and the transistor T0 can stabilize the current i0 to the predetermined current value.

However, when the transistor T0 becomes invalid, the conventional LED driving circuit can not detect this condition. Accordingly, the conventional LED driving circuit can not provide a suitable protection. Furthermore, in this condition, the conventional LED driving circuit can not provide the open-circuit protection or the short-circuit protection for the LEDs by controlling the transistor T0.

SUMMARY OF THE INVENTION

Accordingly, the invention provides LED driving circuits and power converting circuits having the function of circuit detecting. The provided circuits are capable of precisely determining whether the transistors in the LED driving circuits or the power converting circuits normally operate and further providing a suitable circuit protection.

To accomplish the aforementioned and other objects, the embodiment of the invention provides an LED driving circuit having the function of circuit detecting. The LED driving circuit includes a power supply terminal, at least one LED, a switch element, a current control circuit, and a detecting circuit. Herein, the switch element is coupled between the power supply terminal and the at least one LED to determine whether the power supply terminal powers the at least one LED. The current control circuit is coupled between the at least one LED and a reference voltage end and having a first transistor controlling a magnitude of a current flowing through the at least one LED. The detecting circuit detects at least one of a control end, a high voltage end, and a low voltage end of the first transistor. When any one of voltages of the control end, the high voltage end, and the low voltage end is out of a corresponding predetermined voltage range, the detecting circuit generates a state signal to turn off the switch element.

The embodiment of the invention also provides a power converting circuit having the function of circuit detecting. The power converting circuit includes a transistor, a controller, and a detecting circuit. The controller is coupled to a control end of the transistor and controlling a conducting state of the transistor to stabilize an output of the power converting circuit. The detecting circuit detects at least one of the control end and a low voltage end of the transistor and generates a state signal when any one of voltages of the control end and the low voltage end is out of a corresponding predetermined voltage range.

The features and the advantages of the invention can further be realized by following exemplary embodiments accompanied with figures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The main idea of the invention, for example, is to detect the state of the controlled transistor, such as metal oxide semiconductor field effect transistors (MOSFETs) and bipolar junction transistors (BJTs). When the controlled transistor is out of control due to abnormality, the exemplary circuit of the invention generates a state signal to co-ordinate other circuits. For example, the exemplary circuit co-ordinates the other circuits to stop operating or to lower output thereof for protecting. Besides LED driving circuits, the exemplary circuit of the invention can also be applied to power converting circuits such as low dropout regulators (LDOs), DC-to-DC converters, AC-to-DC converters, DC-to-AC converters, or other circuits using transistors for circuit control. These applications will be described in following exemplary embodiments.

Figure 1:
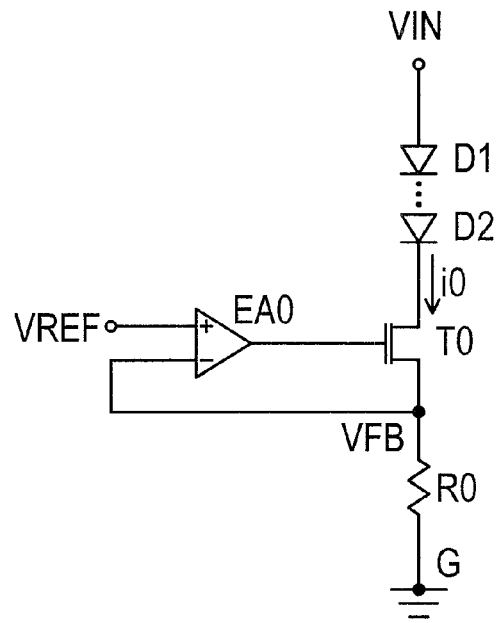
FIG. 1 is a circuit diagram of a conventional LED driving circuit.
Figure 2:
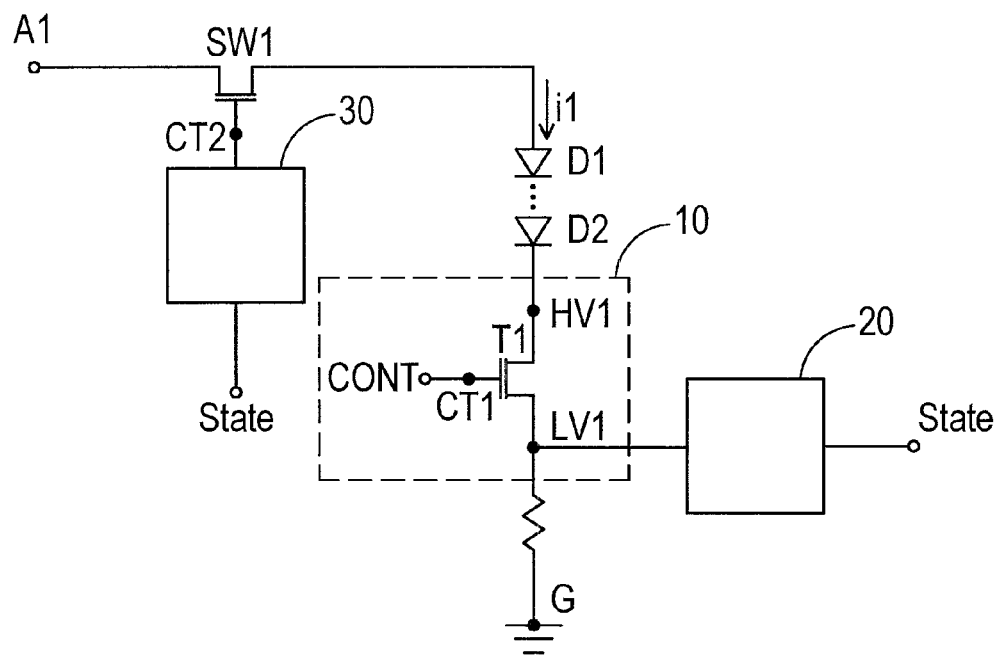
FIG. 2 is a schematic diagram of an LED driving circuit having the function of circuit detecting according to a first embodiment of the invention.

FIG. 2 is a schematic diagram of an LED driving circuit having the function of circuit detecting according to a first embodiment of the invention. As shown in FIG. 2, the LED driving circuit includes a power supply terminal A1, at least one LED, a switch element SW1, a current control circuit 10, a detecting circuit 20. Herein, LEDs D1 to D2 shown in FIG. 2 are exemplary for the at least one LED in FIG. 2. Herein, the switch element SW1 is coupled between the power supply terminal A1 and the LED D1 to determine whether the power supply terminal A1 powers the LEDs D1 to D2. The current control circuit 10 is coupled between the LED D2 and a ground end G (a reference voltage end) and has a first transistor T1. The first transistor T1 controls a magnitude of a current i1 flowing through the LEDs D1 to D2 according to a control signal CONT. The first transistor T1 of the present embodiment is a MOS transistor for example. However, the invention is not limited thereto. The first transistor T1 may be a BJT.

Figure 2A:
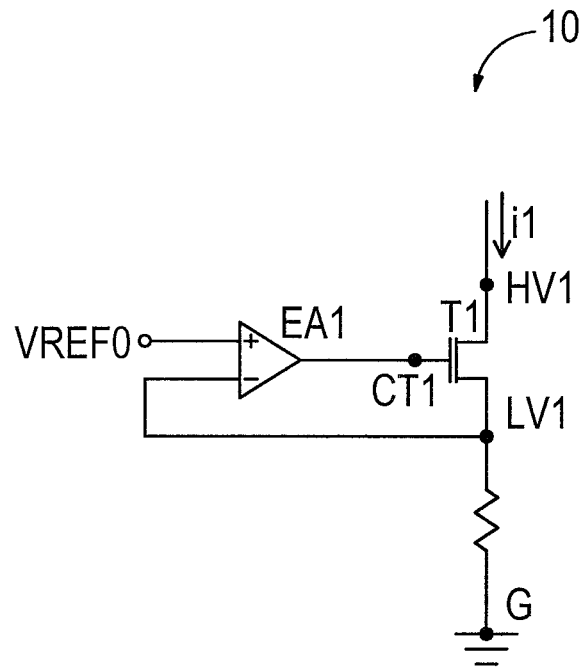
FIG. 2A is a circuit diagram of the current control circuit shown in FIG. 2 according to an embodiment of the invention.

FIG. 2A is a circuit diagram of the current control circuit 10 shown in FIG. 2 according to an embodiment of the invention. As shown in FIG. 2A, the current control circuit 10 includes the first transistor T1 and an error amplifier EA1. A high voltage end HV1 of the first transistor T1 is coupled to the LED D2, and a low voltage end LV1 of the first transistor T1 is coupled to the ground end G through a resistor. An input end of the error amplifier EA1 is coupled to the low voltage end LV1 of the first transistor T1, and another input end of the error amplifier EA1 receives a reference voltage VREF0. The error amplifier EA1 controls the conducting state of the first transistor T1 according to a comparing result of the voltage of the low voltage end LV1 and the reference voltage VREF0 and accordingly stabilizes the voltage of the low voltage end LV1 to the reference voltage VREF0, so as to stabilizes the magnitude of the current i1 flowing through the LEDs D1 to D2.

The detecting circuit 20 detects at least one of a control end CT1, the high voltage end HV1, and the low voltage end LV1 of the first transistor T1. When a voltage of any one of them does not fall within a corresponding predetermined voltage range, the detecting circuit generates a state signal State to turn off the switch element SW1. In the invention, the predetermined voltage range may be a range between a maximum and a minimum or a range larger than a specific value or smaller than the specific value. In the present embodiment, the detecting circuit 20 detects the voltage of the low voltage end LV1 of the first transistor T1 to determine whether to generate the state signal State.

Figure 2B:
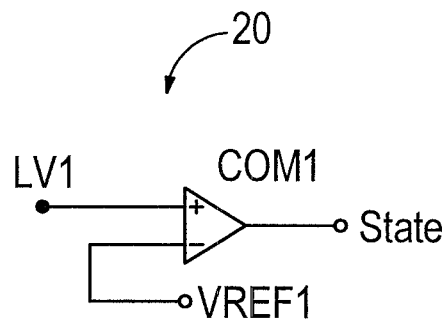
FIG. 2B is a circuit diagram of the detecting circuit shown in FIG. 2 according to an embodiment of the invention.

FIG. 2B is a circuit diagram of the detecting circuit 20 shown in FIG. 2 according to an embodiment of the invention. As shown in FIG. 2B, the detecting circuit 20 includes a comparator COM1. The non-inverting input end of the comparator COM1 is coupled to the low voltage end LV1 of the first transistor T1, and the inverting input end of the comparator COM1 receives a first reference voltage VREF1. During normal operation, the voltage of the low voltage end LV1 of the first transistor T1 is maintained to be below the first reference voltage VREF1. However, when the first transistor T1 is short-circuit, the voltage of the low voltage end LV1 rapidly increases and higher than the first reference voltage VREF1. At this time, the comparator COM1 generates the state signal State with a high level, representing the abnormality of the first transistor T1.

Figure 2C:
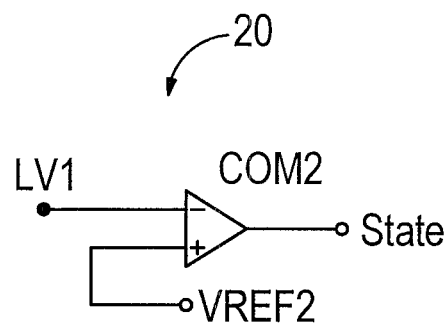
FIG. 2C is a circuit diagram of the detecting circuit shown in FIG. 2 according to another embodiment of the invention.

FIG. 2C is a circuit diagram of the detecting circuit 20 shown in FIG. 2 according to another embodiment of the invention. The detecting circuit 20 shown in FIG. 2B detects whether the first transistor T1 is short-circuit. Differently, the detecting circuit 20 of the present embodiment detects whether the first transistor T1 is open-circuit. As shown in FIG. 2C, the detecting circuit 20 includes a comparator COM2. The inverting input end of the comparator COM2 is coupled to the low voltage end LV1 of the first transistor T1, and the non-inverting input end of the comparator COM1 receives a second reference voltage VREF2. During normal operation, the voltage of the low voltage end LV1 of the first transistor T1 is maintained to be above the second reference voltage VREF2. However, when the first transistor T1 is open-circuit, the voltage of the low voltage end LV1 rapidly decreases and is lower than the second reference voltage VREF2. At this time, the comparator COM2 generates the state signal State with the high level, representing the abnormality of the first transistor T1.

The signal with the high level outputted by the comparator COM1 or COM2 is set as the state signal State in the aforementioned embodiments of FIG. 2B and FIG. 2C However, the invention is not limited thereto. By exchanging the signals respectively received by the non-inverting input end and the inverting input end of the comparator COM1 or COM2, the signal with the low level outputted by the comparator COM1 or COM2 can be set as the state signal State.

As shown in FIG. 2, the LED driving circuit of the present embodiment further includes the control circuit 30 coupled to a control end CT2 of the switch element SW1. After receiving the state signal State, the control circuit 30 turns off the first transistor T1 according to the state signal State.

Figure 2D:
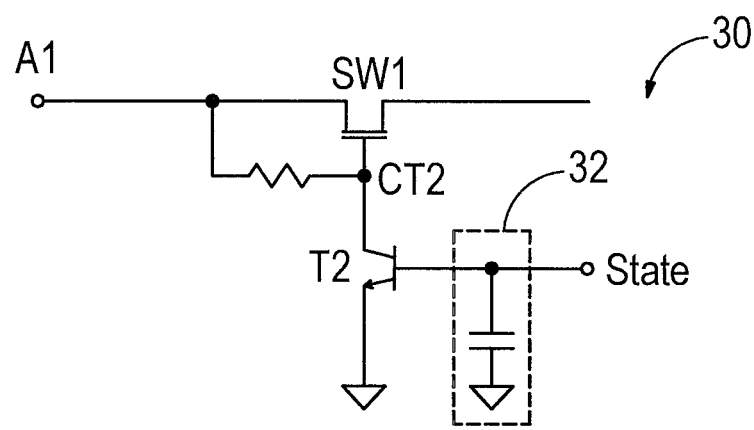
FIG. 2D is a circuit diagram of the control circuit according to an embodiment of the invention.

FIG. 2D is a circuit diagram of the control circuit 30 according to an embodiment of the invention. As shown in FIG. 2D, the control circuit 30 includes a second transistor T2 and a noise filtering circuit 32. Herein, the second transistor T2 is coupled between the control end CT2 of the switch element SW1 and a ground end. The noise filtering circuit 32 is coupled to the control end of the second transistor T2. When receiving the state signal State, the noise filtering circuit 32 does not immediately generate a control signal to turn on the second transistor T2. Instead, until duration of the state signal State is longer than a predetermined period, that is, the abnormality of the first transistor T1 certainly occurs, the noise filtering circuit 32 simply turns on the second transistor T2. After the second transistor T2 is turned on, the control end CT2 of the switch element SW1 is rapidly pulled down, such that the switch element SW1 is switched from an on state to an off state to stop the power supply terminal A1 powering the LEDs D1 to D2.

Next, before the power supply terminal A1 has not powered the LEDs D1 to D2 yet, the voltage of each end of the first transistor T1 may also is out of the aforementioned predetermined voltage range, such that an erroneous operation may occur. In order to prevent this issue from occurring, the detecting circuit 20 can simultaneously confirm the state of the power supply terminal A1 to determine whether to start to detect the voltage of the end of the first transistor T1 according to whether the power supply terminal A1 has already stably powered the LEDs D1 to D2, so as to output the state signal State. Alternatively, by directly detecting the voltage of each end of the first transistor T1, the detecting circuit 20 can simply start to determine whether to output the state signal State according to the voltage of each end when the voltage of the detected end is out of the corresponding predetermined voltage range and thereby it is ensured that the power supply terminal A1 has already stably powered the LEDs D1 to D2.

Figure 3:
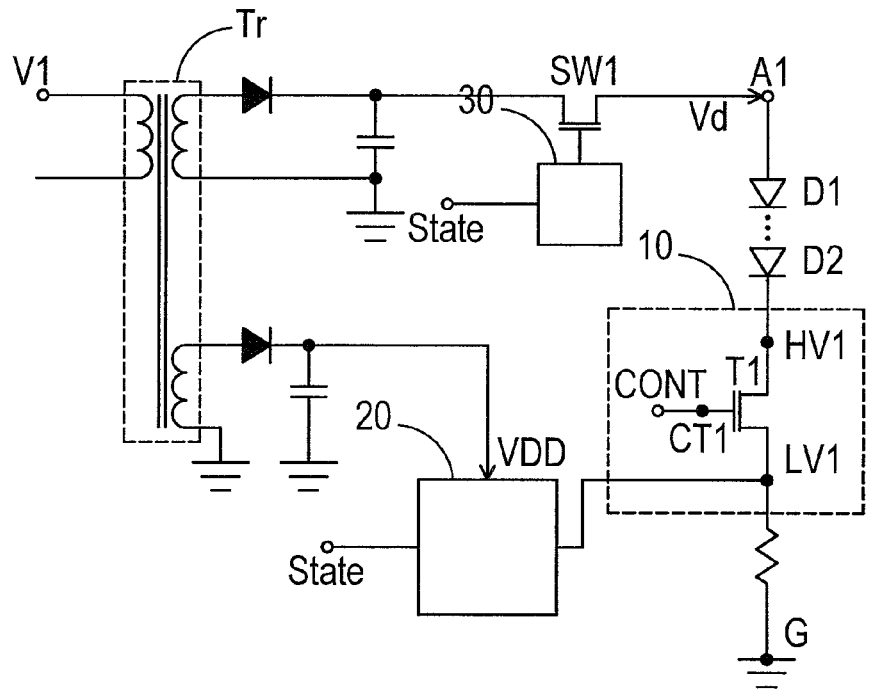
FIG. 3 is a schematic diagram of a system with an LED driving circuit having the function of circuit detecting according to an embodiment of the invention.

FIG. 3 is a schematic diagram of a system with an LED driving circuit having the function of circuit detecting according to an embodiment of the invention. As shown in FIG. 3, the system includes a transformer Tr. The transformer Tr includes a first winding a second winding, and an auxiliary winding and is used to convert the input voltage V1 to a first driving voltage Vd and a second driving voltage VDD. Herein, the first driving voltage Vd is provided to the power supply terminal A1 to drive the LEDs D1 to D2. The second driving voltage VDD is provided to the detecting circuit 20 for operation. When the power supply terminal A1 has stably powered the LEDs, the second driving voltage VDD is also stably provided to the detecting circuit 20, such that the detecting circuit 20 starts to detect the voltage of the end of the first transistor T1.

In addition, as shown in FIG. 3, the system in the present embodiment may further includes the switch element SW1 coupled between the transformer Tr and the LEDs D1 to D2 as the circuit in the embodiment of FIG. 2, and determines whether to stop the transformer Tr powering the LEDs D1 to D2 by a control circuit 30 according to the state signal State.

Figure 4:
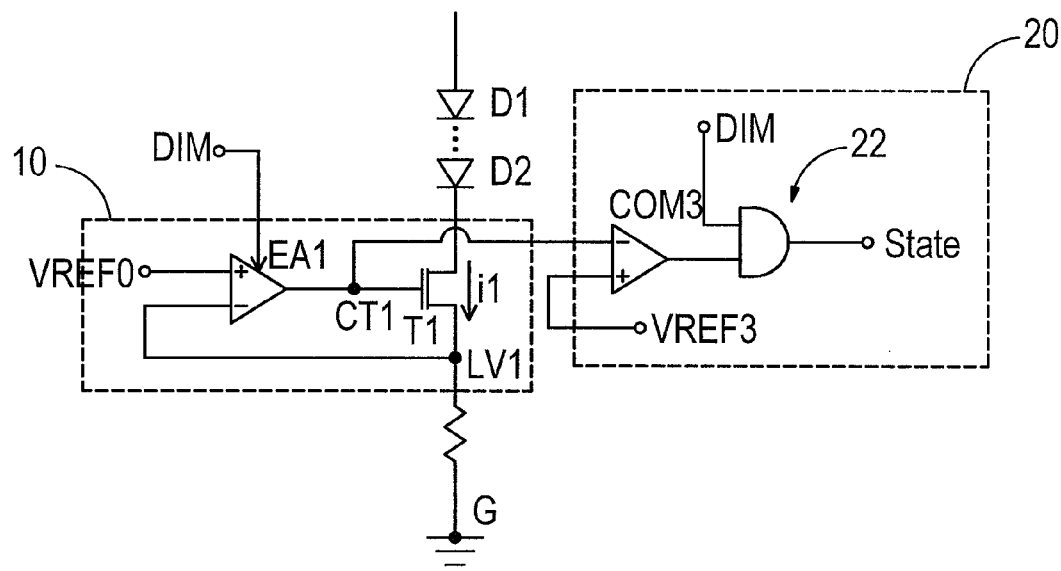
FIG. 4 is a schematic diagram of an LED driving circuit having the function of circuit detecting according to a second embodiment of the invention.

FIG. 4 is a schematic diagram of an LED driving circuit having the function of circuit detecting according to a second embodiment of the invention. The difference between the present embodiment and the first embodiment of the invention, for example, lies in that, the detecting circuit 20 of the present embodiment detects the voltage of the control end CT1 of the first transistor T1. Furthermore, the detecting circuit 20 simultaneously receives a dimming signal DIM to avoid erroneously determining the voltage variation due to the dimming process as the abnormality of the transistor.

The current control circuit 10 adjusts the average brightness of the LEDs D1 to D2 according to the period of the duty cycle of the dimming signal DIM. The dimming signal DIM may be inputted to the error amplifier EA1 to control the output of the error amplifier EA1. Alternatively, the dimming signal DIM may be used to adjust the level of the reference voltage VREF0 to change the output of the error amplifier EA1.

The detecting circuit 20 includes a comparator COM3 and a logic gate 22. The inverting input end of the comparator COM3 is coupled to the control end CT1 of the first transistor T1, and the non-inverting input end of the comparator COM3 receives a third reference voltage VREF3. The comparator COM3 compares the voltage of the control end CT1 of the first transistor T1 with the third reference voltage VREF3. The logic gate 22 receives an output signal outputted by the comparator COM3 and a dimming signal DIM and determines whether the voltage variation of the control end CT1 of the first transistor T1 is related to the dimming signal DIM, so as to determine whether to generate the state signal State.

Furthermore, when the first transistor T1 is short-circuit, the current flowing through the first transistor T1 suddenly increases. At this time, in order to stabilize the current flowing through the LEDs D1 to D2, the current control circuit 10 rapidly decreases the voltage of the control end CT1 of the first transistor T1, such that the voltage of the control end CT1 is lower than the third reference voltage VREF3. However, when the dimming signal DIM stays at the dimming off period, the voltage of the control end CT1 of the first transistor T1 also decreases. In this case, it may also cause the voltage of the control end CT1 to be lower than the third reference voltage VREF3. Accordingly, simply based on the generation of the output signal with the high level by the comparator COM3, it cannot be determined whether the cause is the short-circuit of the first transistor T1 or the dimming process.

In order to confirm whether the first transistor T1 is short-circuit indeed, the logic gate 22 simultaneously receives the output signal from the comparator COM3 and the dimming signal DIM to perform a logic operation. Regarding the logic operation, the dimming signal DIM with the low level, for example, represents that the LEDs D1 to D2 does not emit light, and the logic gate 22 may be a AND gate. When the output signal of the comparator COM3 and the dimming signal DIM both have the high levels, the logic gate 22 simply generates the state signal State with the high level displaying the abnormality of the first transistor T1.

Figure 4A:
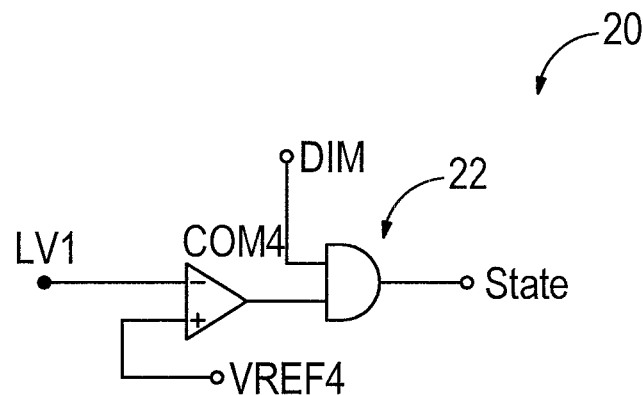
FIG. 4A is a circuit diagram of the detecting circuit shown in FIG. 4 according to another embodiment of the invention.

FIG. 4A is a circuit diagram of the detecting circuit 20 shown in FIG. 4 according to another embodiment of the invention. The detecting circuit 20 shown in FIG. 4 detects whether the first transistor T1 is short-circuit. Differently, the detecting circuit 20 of the present embodiment detects whether the first transistor T1 is open-circuit. Furthermore, the detecting circuit 20 shown in FIG. 4 detects the voltage of the control end CT1 of the first transistor T1. Differently, the detecting circuit 20 of the present embodiment detects the voltage of the low voltage end LV1 of the first transistor T1. As shown in FIG. 4A, the detecting circuit 20 includes a comparator COM4 and a logic gate 22. The inverting input end of the comparator COM4 is coupled to the low voltage end LV1 of the first transistor T1, and the non-inverting input end of the comparator COM4 receives a fourth reference voltage VREF4. The comparator COM4 compares the voltage of the low voltage end LV1 of the first transistor T1 with the fourth reference voltage VREF4. The logic gate 22 receives an output signal outputted by the comparator COM4 and a dimming signal DIM and determines whether the voltage variation of the low voltage end LV1 of the first transistor T1 is related to the dimming signal DIM, so as to determine whether to generate the state signal State.

Furthermore, when the first transistor T1 is open-circuit, the current flowing through the first transistor T1 suddenly disappears. At this time, the voltage of the low voltage end LV1 decreases to zero and is lower than the fourth reference voltage VREF4. However, when the dimming signal DIM stays at the dimming off period, the current does not flow through the LEDs D1 to D2. In this case, the voltage of the low voltage end LV1 may also be lower than the fourth reference voltage VREF4. Accordingly, simply based on the generation of the output signal with the high level by the comparator COM4, it may not be determined whether the cause is the open-circuit of the first transistor T1 or the dimming process of the LEDs D1 to D2.

In order to confirm whether the first transistor T1 is open-circuit indeed, the logic gate 22 simultaneously receives the output signal from the comparator COM4 and the dimming signal DIM to perform a logic operation. When the output signal of the comparator COM4 and the dimming signal DIM both have the high levels, the logic gate 22 simply generates the state signal State with the high level displaying the abnormality of the first transistor T1.

Figure 5:
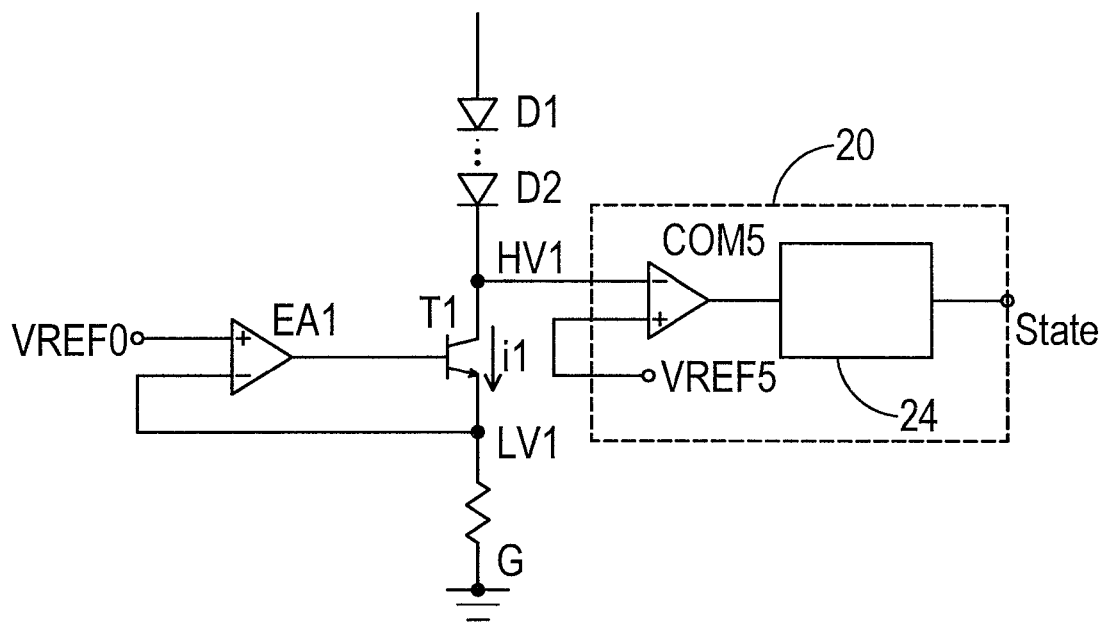
FIG. 5 is a schematic diagram of an LED driving circuit having the function of circuit detecting according to a third embodiment of the invention.

FIG. 5 is a schematic diagram of an LED driving circuit having the function of circuit detecting according to a third embodiment of the invention. The difference between the present embodiment and the first embodiment of the invention, for example, lies in that the detecting circuit 20 is coupled to the high voltage end HV1 of the first transistor T1, i.e. the connection of the first transistor T1 and the diode D2. Furthermore, the first transistor T1 of the present embodiment is a BJT instead of a MOS transistor in the first embodiment. In addition, the detecting circuit 20 of the present embodiment includes a time counter circuit 24 which generates the state signal State according to the output signal of the comparator COM5.

The inverting input end of the comparator COM5 of the present embodiment is coupled to the high voltage end HV1 of the first transistor T1, and the non-inverting input end of the comparator COM5 receives a fifth reference voltage VREF5. During normal operation, the voltage of the high voltage end HV1 of the first transistor T1 can be stabilized within a predetermined voltage range through feedback control provided by the error amplifier EA1. The fifth reference voltage VREF5 may be set as the minimum of the predetermined voltage range. When the first transistor T1 is short-circuit, the voltage of the high voltage end HV1 of the first transistor T1 rapidly decreases and is lower than the fifth reference voltage VREF5. At this time, the comparator COM5 generates a signal with the high level outputted to the timer counter circuit 24.

When receiving the signal with the high level generated by the comparator COM5, the timer counter circuit 24 does not immediately generate the state signal State. Instead, until duration of the signal with the high level generated by the comparator COM5 is longer than a predetermined period, the timer counter circuit 24 simply generates the state signal State. In another embodiment, the tinier counter circuit 24 may includes a capacitor. The signal with the high level generated by the comparator COM5 charges the capacitor, and when the voltage of the capacitor is higher than a predetermined voltage, the timer counter circuit 24 simply generates the state signal State.

The main function of the timer counter circuit 24, for example, is to prevent an erroneous operation. During normal operation, the voltage of each end of the first transistor T1 may still suddenly change due to noise. Accordingly, the timer counter circuit 24 simply generates the state signal State when the voltage of the high voltage end HV1 of the first transistor T1 is lower than the fifth reference voltage VREF5 for a specific period for avoiding erroneous judgement.

Figure 6:
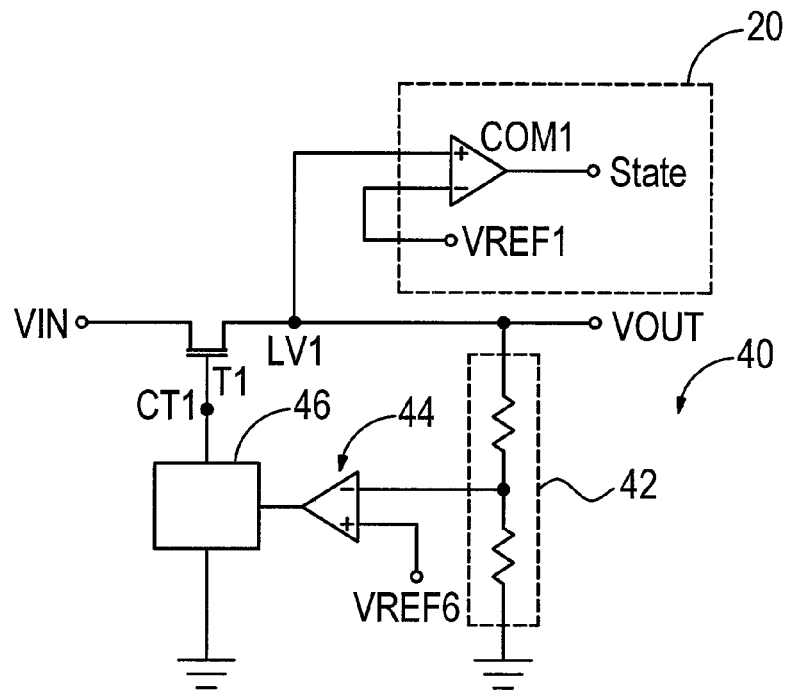
FIG. 6 is a schematic diagram of a power converting circuit having the function of circuit detecting according to a first embodiment of the invention.

FIG. 6 is a schematic diagram of a power converting circuit having the function of circuit detecting according to a first embodiment of the invention. In the present embodiment, a low dropout regulator (LDO) is exemplary. As shown in FIG. 6, the LDO includes a first transistor T1, a controller 40, and a detecting circuit 20. Herein, the controller 40 includes a voltage dividing resistor 42, an error amplifier 44, and a driving circuit 46. The output VOUT of the LDO is provided to the error amplifier 44 through the voltage dividing resistor 42. The error amplifier 44 receives a signal from the voltage dividing resistor 42 and a sixth reference voltage VREF6 to generate a feedback signal to the driving circuit 46. The driving circuit 46 is coupled to the control end CT1 of the first transistor T1 and controls the conducting state of the first transistor T1 according to the feedback signal, so as to stabilize the output VOUT of the LDO accordingly.

The detecting circuit 20 detects the voltage of the low voltage end LV1 of the first transistor T1 and generates the state signal State when detecting the voltage of the detected end not within a predetermined voltage range. The operation of the detecting circuit 20 in the present embodiment is similar to that of the detecting circuit 20 in the first embodiment, and it will not be described again herein. Furthermore, the detecting circuit 20 of the present embodiment detects the voltage of the low voltage end LV1 of the first transistor T1, but the invention is not limited thereto. The detecting circuit 20 can also confirm whether the first transistor T1 abnormally operates by detecting the voltage of the control end CT1 of the first transistor T1.

Figure 7:
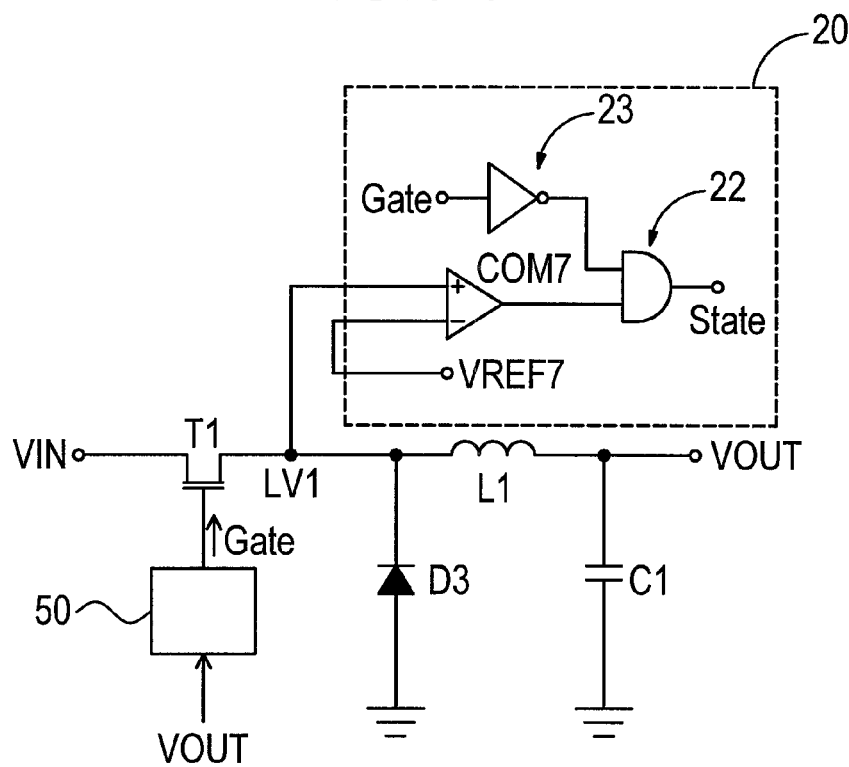
FIG. 7 is a schematic diagram of a power converting circuit having the function of circuit detecting according to a second embodiment of the invention.

FIG. 7 is a schematic diagram of a power converting circuit having the function of circuit detecting according to a second embodiment of the invention. In the present embodiment, a buck circuit is exemplary. As shown in FIG. 7, the buck circuit includes a first transistor T1, a diode D3, an inductor L1, a capacitor C1, a controller 50, and a detecting circuit 20. The controller 50 is coupled to the control end of the first transistor T1 and generates a gate control signal Gate to control the conducting period of the first transistor T1 according to the level of the output voltage VOUT of the buck circuit. The detecting circuit 20 includes a comparator COM7 and a logic gate 22. The comparator COM7 detects the voltage of the low voltage end LV1 of the first transistor T1 and compares the voltage with a seventh reference voltage VREF7. The gate control signal Gate is inputted to the logic gate 22 through an inverter 23. The logic gate 22 may be an AND gate. The logic gate 22 determines whether the voltage variation of the low voltage end LV1 of the first transistor T1 is related to the gate control signal Gate to determine whether to output the state signal State. When the first transistor T1 is short-circuit, the voltage of the low voltage end LV1 is higher than the seventh reference voltage VREF7. However, when the gate control signal Gate stays at the high level to turn on the first transistor T1, the voltage of the low voltage end LV1 may also be higher than the seventh reference voltage VREF7. In order to confirm whether the first transistor T1 is short-circuit indeed, the logic gate 22 simultaneously receives the output signal from the comparator COM7 and the gate control signal Gate to perform the logic operation. When the output signal of the comparator COM7 has the high level (the voltage of the low voltage end LV1 is higher than the seventh reference voltage VREF7), and the gate control signal Gate has the low level, the logic gate 22 simply generates the state signal State with the high level displaying the abnormality of the first transistor T1.

The exemplary embodiments of the invention provide the LED driving circuits or the power converting circuits having the function of circuit detecting. The circuits of the exemplary embodiments in the invention are capable of precisely determining whether the transistors is out of control such as short-circuit or open-circuit. Furthermore, when the transistors can not be controlled normally, the circuits of the exemplary embodiments in the invention generate the state signals to stop the controlled transistors powering LEDs so as to avoid the abnormality of the controlled transistors damaging the circuits.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the invention.

What is claimed is:

1. A light emitting diode driving circuit, having a function of circuit detecting, the light emitting diode driving circuit comprising:
    a power supply terminal;
    at least one light emitting diode (LED);
    a switch element coupled between the power supply terminal and the at least one LED to determine whether the power supply terminal powers the at least one LED;
    a current control circuit coupled between the at least one LED and a reference voltage end and having a first transistor controlling a magnitude of a current flowing through the at least one LED;
    a detecting circuit detecting at least one of a control end, a high voltage end, and a low voltage end of the first transistor and generating a state signal to turn off the switch element when any one of voltages of the control end, the high voltage end, and the low voltage end is out of a corresponding predetermined voltage range; and
    a control circuit coupled to a control end of the switch element, wherein the control circuit turns off the switch element when receiving the state signal.

2. The LED driving circuit as claimed in claim 1, wherein the control circuit comprises a second transistor coupled between the control end of the switch element and the reference voltage end, and the state signal turns on the second transistor to turn off the switch element.

3. The LED driving circuit as claimed in claim 2, wherein the control circuit further comprises a noise filtering circuit coupled to the second transistor, and the noise filtering circuit receives the state signal and determines whether to turn on the second transistor according to a duration of the state signal.

4. The LED driving circuit as claimed in claim 1, wherein the detecting circuit determines whether to output the state signal only when the power supply terminal powers the at least one LED.

5. The LED driving circuit as claimed in claim 1, wherein the detecting circuit comprises a comparator and a logic gate, the comparator is coupled to the control end of the first transistor and compares a voltage of the control end of the first transistor with a reference voltage, and the logic gate receives an output signal outputted by the comparator and a dimming signal to determine whether to generate the state signal accordingly.

6. A power converting circuit, comprising:
    a transistor coupled to an input voltage;
    a controller coupled to a control end of the transistor and controlling a conducting state of the transistor to stabilize an output of the power converting circuit; and
    a detecting circuit detecting at least one of the control end and a low voltage end of the transistor and generating a state signal when any one of voltages of the control end and the low voltage end is out of a corresponding predetermined voltage range, wherein the state signal stops a power circuit which provides the input voltage providing the input voltage, a control circuit coupled to a control end of a switch element, wherein the control circuit turns off the switch element when receiving the state signal.

7. The power converting circuit as claimed in claim 6, wherein the detecting circuit outputs the state signal when a voltage of the low voltage end is higher than a first reference voltage.

8. The power converting circuit as claimed in claim 6, wherein the detecting circuit outputs the state signal when a voltage of the low voltage end is lower than a second reference voltage.

9. The power converting circuit as claimed in claim 6, wherein the detecting circuit outputs the state signal when a voltage of the control end is lower than a third reference voltage.

10. The power converting circuit as claimed in claim 6, wherein the detecting circuit outputs the state signal when a voltage of the control end is higher than a fourth reference voltage.

11. The power converting circuit as claimed in claim 6, wherein the transistor is a bipolar junction transistor (BJT) or a metal oxide semiconductor (MOS) transistor.

12. The power converting circuit as claimed in claim 6, wherein the detecting circuit comprises a comparator comparing a voltage of the control end or the low voltage end of the transistor with a reference voltage.

13. The power converting circuit as claimed in claim 6, wherein the detecting circuit further comprises a timer counter circuit receiving an output signal of the comparator to determine whether to generate the state signal.

* * * * *